(12) United States Patent
Ishida et al.

(10) Patent No.: US 7,978,351 B2
(45) Date of Patent: Jul. 12, 2011

(54) PRINTER CONFIGURATION DATA SETTING METHOD AND SERVER USING THE PRINTER CONFIGURATION DATA

(75) Inventors: Akio Ishida, Kanagawa (JP); Hisashi Ishihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 11/971,685

(22) Filed: Jan. 9, 2008

(65) Prior Publication Data

US 2008/0180734 A1 Jul. 31, 2008

Related U.S. Application Data

(62) Division of application No. 10/638,233, filed on Aug. 8, 2003, now abandoned.

(30) Foreign Application Priority Data

Aug. 9, 2002 (JP) .................................. 2002-233528

(51) Int. Cl.
*G06F 3/12* (2006.01)
*G06F 15/16* (2006.01)
*G06F 15/173* (2006.01)
*G06F 15/177* (2006.01)

(52) U.S. Cl. ....... 358/1.13; 709/203; 709/217; 709/224; 719/327; 708/173

(58) Field of Classification Search .......... 709/200–203, 709/217, 224; 358/1.13; 708/173; 700/227
See application file for complete search history.

(56) References Cited

U.S. PATENT DOCUMENTS

| 6,532,491 | B1 * | 3/2003 | Lakis et al. ................... 709/223 |
| 6,814,510 | B1 | 11/2004 | Sabbagh et al. |
| 7,143,150 | B1 * | 11/2006 | Nuggehalli ................... 709/221 |
| 2001/0013063 | A1 | 8/2001 | Hall et al. |
| 2002/0018234 | A1 | 2/2002 | Fu et al. |
| 2003/0033368 | A1 * | 2/2003 | Tominaga ..................... 709/203 |
| 2003/0184782 | A1 * | 10/2003 | Perkins et al. ................ 358/1.13 |
| 2005/0052660 | A1 | 3/2005 | Sabbagh et al. |

FOREIGN PATENT DOCUMENTS

| JP | 2000-172465 | 6/2000 |
| JP | 2001-260489 | 9/2001 |
| JP | 2002-55794 | 2/2002 |

* cited by examiner

*Primary Examiner* — Haresh N Patel
(74) *Attorney, Agent, or Firm* — Cooper & Dunham LLP

(57) ABSTRACT

A method for setting configuration data of a printer for a printer driver in a server is provided, in which the server is used in an image printing system that includes a client, the printer and the server including the printer driver for the printer. In the method, the server stores the configuration data obtained from the printer, and a configuration data obtaining part in the server reads the stored configuration data according to a request from the printer driver, and sends the configuration data to the printer driver.

8 Claims, 9 Drawing Sheets

PRINTER CONFIGURATION DATA SETTING METHOD AND SERVER USING THE PRINTER CONFIGURATION DATA

CROSS-REFERENCE TO RELATED APPLICATION

This application is a divisional of U.S. Ser. No. 10/638,233, filed Aug. 8, 2003, now abandoned, the entire contents of which are herein incorporated by reference.

BACKGROUND OF THE INVENTION

1. Technical Field

This disclosure relates to technology for reflecting configuration data of a printer on a printer driver in a server used for server-based environment (for example, "Metaframe" environment) in which applications run only in the server.

2. Description of the Related Art

To solve problems of a conventional client/server system, there is a system in which application programs run only in a server instead of in clients. A system introducing the Metaframe server is an example of such a system.

Figure 1:
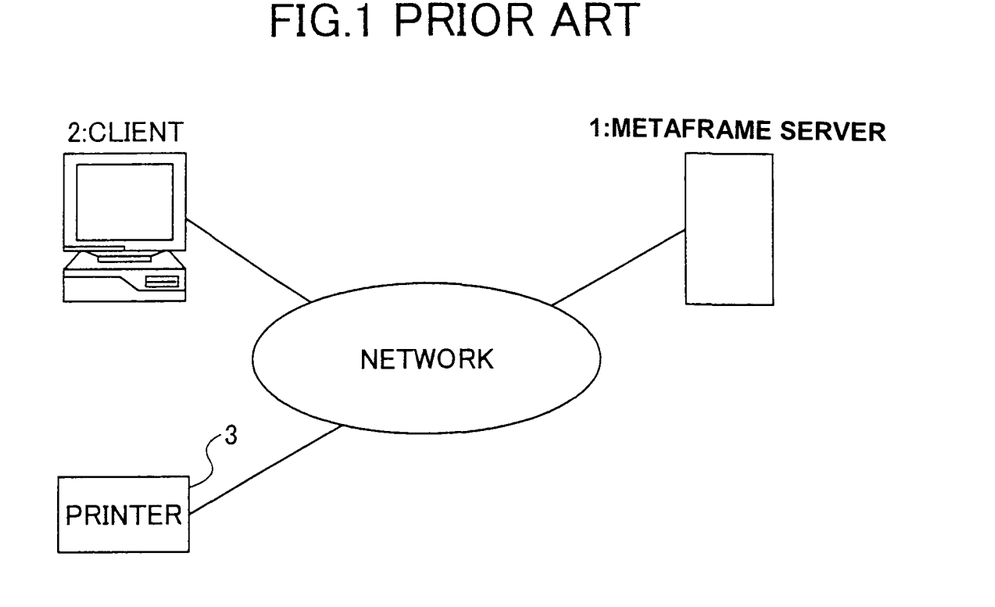
FIG. 1 shows an example of a Metaframe environment.

FIG. 1 shows an example of the Metaframe environment. An application program run on an Metaframe server 1, and a client 2 only displays execution results of the application program.

To use a printer 3 in the Metaframe environment, for example, a printer driver is installed in the Metaframe server 1 beforehand, and a logical printer of the printer 3 is auto-created when the client 2 that uses the printer 3 logs to the Metaframe server 1. When printing is performed from the client 2, print data is generated in the Metaframe server 1, and the print data is redirected to the printer 3 via the client 2, so that the printer 3 prints the print data. According to the printer auto-creation in the Metaframe environment, although the application is running only in the server, the user can print from the application running on the Metaframe server 1 to her local printers, just like she can print from local applications. For example, "Inside Citrix Metaframe XP" of Addison-Wesley refers to the printer auto-creation process in more detail.

In addition, US2002/0018234A1 discloses a conventional technology of a Metaframe print system. The US2002/0018234A1 discloses a universal printer driver that can be used in the Metaframe environment.

In the printer system of the Metaframe environment, there is a problem in that, although printer options are set in the client side printer driver, the option setting is not reflected on the printer driver in the Metaframe server side in the printer auto-creation process.

That is, option setting in the logical printer remains default setting. For example, even if the printer has a double-sided tray, the setting of the auto-created logical printer remains no double-sided tray. In addition, settings for paper size and paper type of tray remain default.

BRIEF SUMMARY

In an aspect of this disclosure, there is provided technology to reflect configuration data of a printer on a printer driver on the server in an environment in which application programs run only on the server instead of on clients.

In another aspect, there is provided a method for setting configuration data of a printer for a printer driver in a server of an image printing system that includes a client, the printer and the server including the printer driver for the printer, the method including the step of:

storing the configuration data obtained from the printer into the server;

wherein a configuration data obtaining part in the server reads the stored configuration data according to a request from the printer driver, and sends the configuration data to the printer driver.

Accordingly, since the configuration data is stored in the server and the configuration data obtaining part provides the configuration data to the printer driver, the configuration data can be reflected on the printer driver. Therefore, the user can print something by performing option setting such as tray setting and the like even in, for example, a Metaframe environment in which the server cannot obtain the configuration data from the printer.

BRIEF DESCRIPTION OF THE DRAWINGS

The aforementioned and other aspects, features and advantages will become more apparent from the following detailed description when read in conjunction with the accompanying drawings, in which.

DETAILED DESCRIPTION OF THE PREFERRED EMBODIMENTS

As described in the related art, there is a problem in that option setting in the printer driver in the client side is not inherited to the printer driver in the Metaframe server. The reason of the problem will be described in the following.

Figure 2:
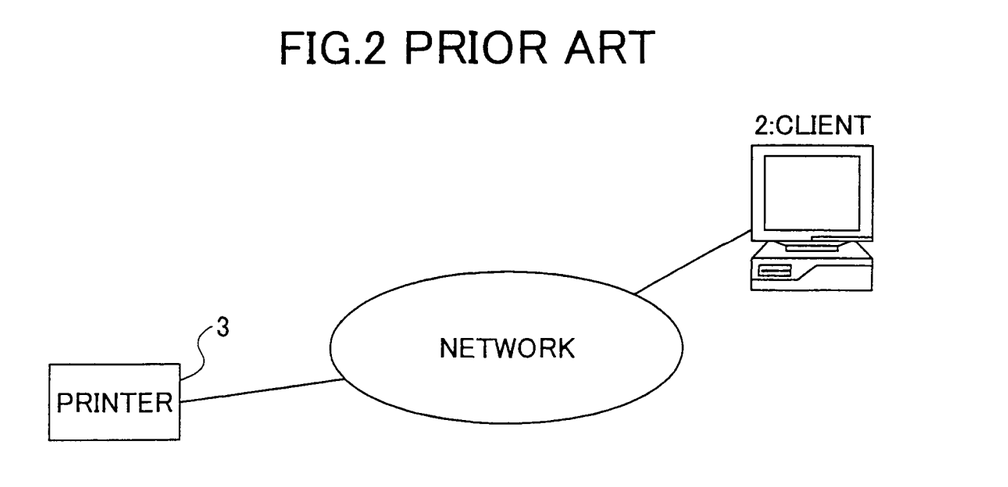
FIG. 2 shows a normal configuration including the client 2 and the printer 3.

In a normal configuration including the client 2 and the printer 3 shown in FIG. 2, the client 2 and the printer 3 performs bidirectional communication so that option data such as the double-sided tray of the printer 3 can be obtained by the client 2. The bidirectional communication is performed, for example, in a configuration shown in FIG. 3. In this configuration, a network communication module 6 obtains information specified by a bidirectional communication module 5 from the printer 3 via a network by using a protocol such as SNMP, in which the bidirectional communication module 5 is a part of the printer driver 4.

However, the above-mentioned bidirectional communication is not available between the Metaframe server 1 and the printer 3 in the Metaframe environment. Therefore, the option data can not be obtained by the printer driver in the Metaframe server. Thus, the above-mentioned problem arises.

In the following, embodiments of the present invention will be described.

(Outline of System Configuration)

In the present embodiment, in an network environment shown in FIG. 1, the client 2 obtains configuration data (option setting data) of the printer 3 by using a configuration data obtaining tool, in which the configuration data can not be obtained from the Metaframe server by the bidirectional communication. The configuration data is stored in the Metaframe server 1 (hereinafter, the configuration data will be also called as pseudo-bidirectional communication data).

The Metaframe server 1 accesses the stored data so that the printer driver in the Metaframe server 1 obtains the configuration data, and the configuration data can be reflected on the option setting of the auto-created logical printer.

Figure 4:
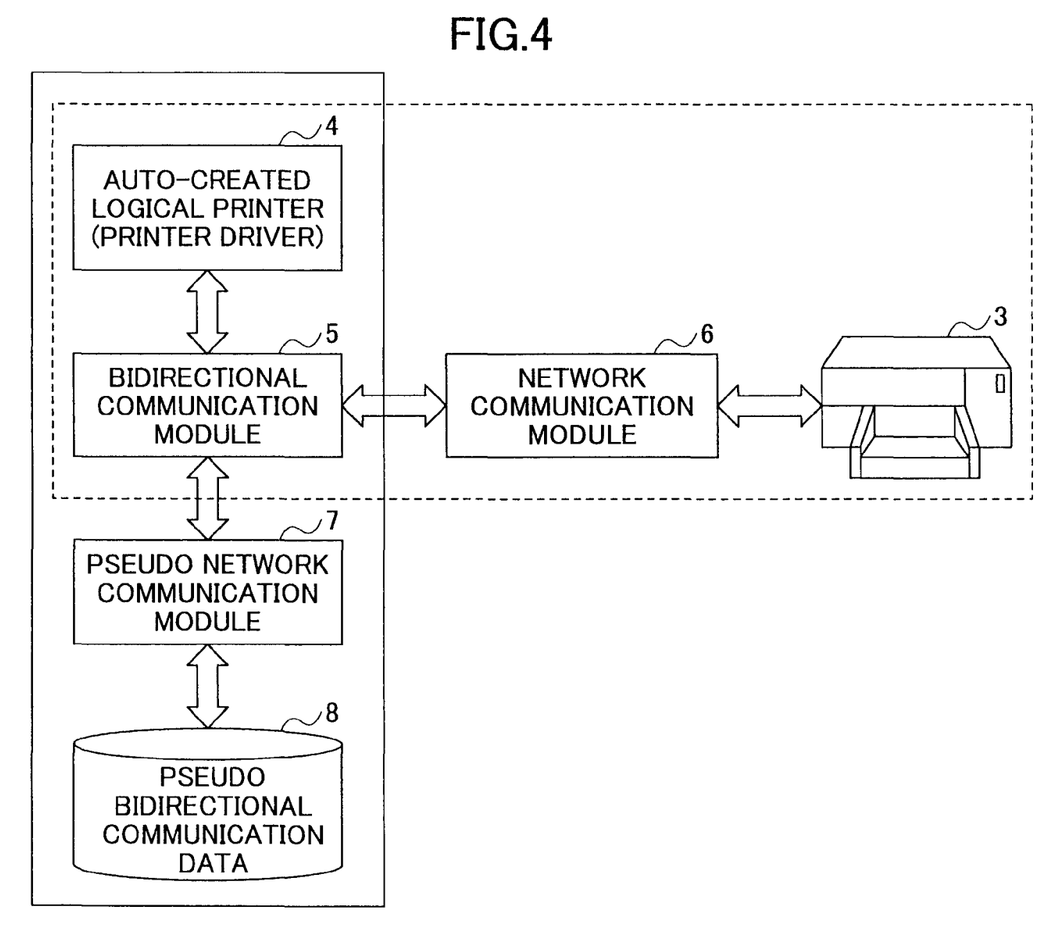
FIG. 4 shows a software module configuration in the Metaframe server 1 (enclosed by a solid line square) according to an embodiment of the present invention.

FIG. 4 shows a software module configuration in the Metaframe server 1 (enclosed by a solid line square). For comparison, a conventional configuration is shown enclosed by a dotted line square.

As shown in FIG. 4, the network communication module 6 is not used, but, a pseudo network communication module 7 is used. Accordingly, the printer driver 4 obtains configuration data, via the pseudo network communication module 7, from the pseudo bidirectional communication data 8 that is stored beforehand.

(Flow of Processing)

Next, processing in the present embodiment will be described in more detail with reference to FIGS. 5-7.

Figures 5A, 5B:
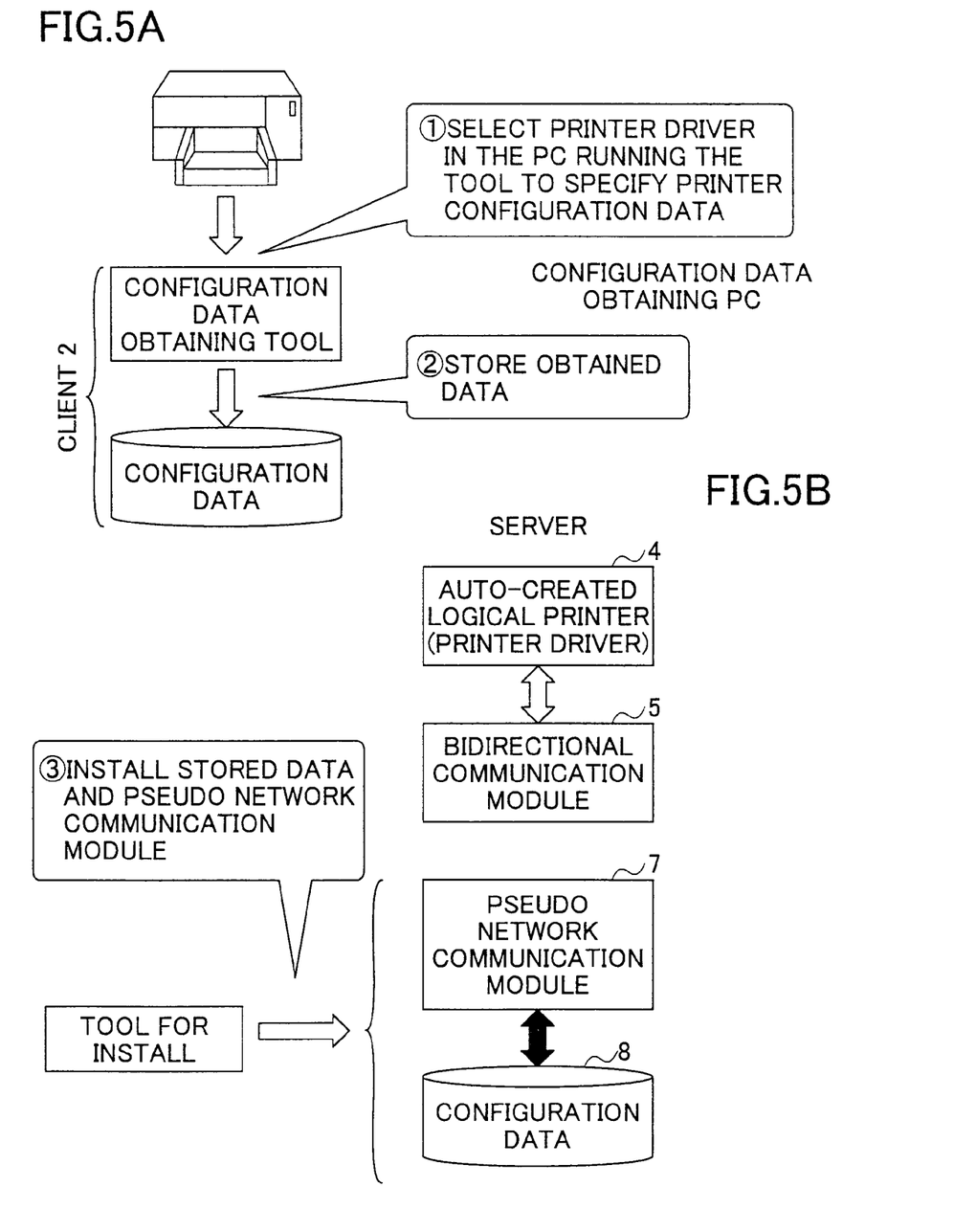
FIG. 5A is a figure for explaining how to obtain configuration data by the client 2.
FIG. 5B is a figure for explaining how to obtain configuration data by the printer driver.

FIG. 5A is a figure for explaining how to obtain configuration data by the client 2. As shown in the figure, the client 2 in which the configuration data obtaining tool runs obtains the configuration data.

Figure 3:
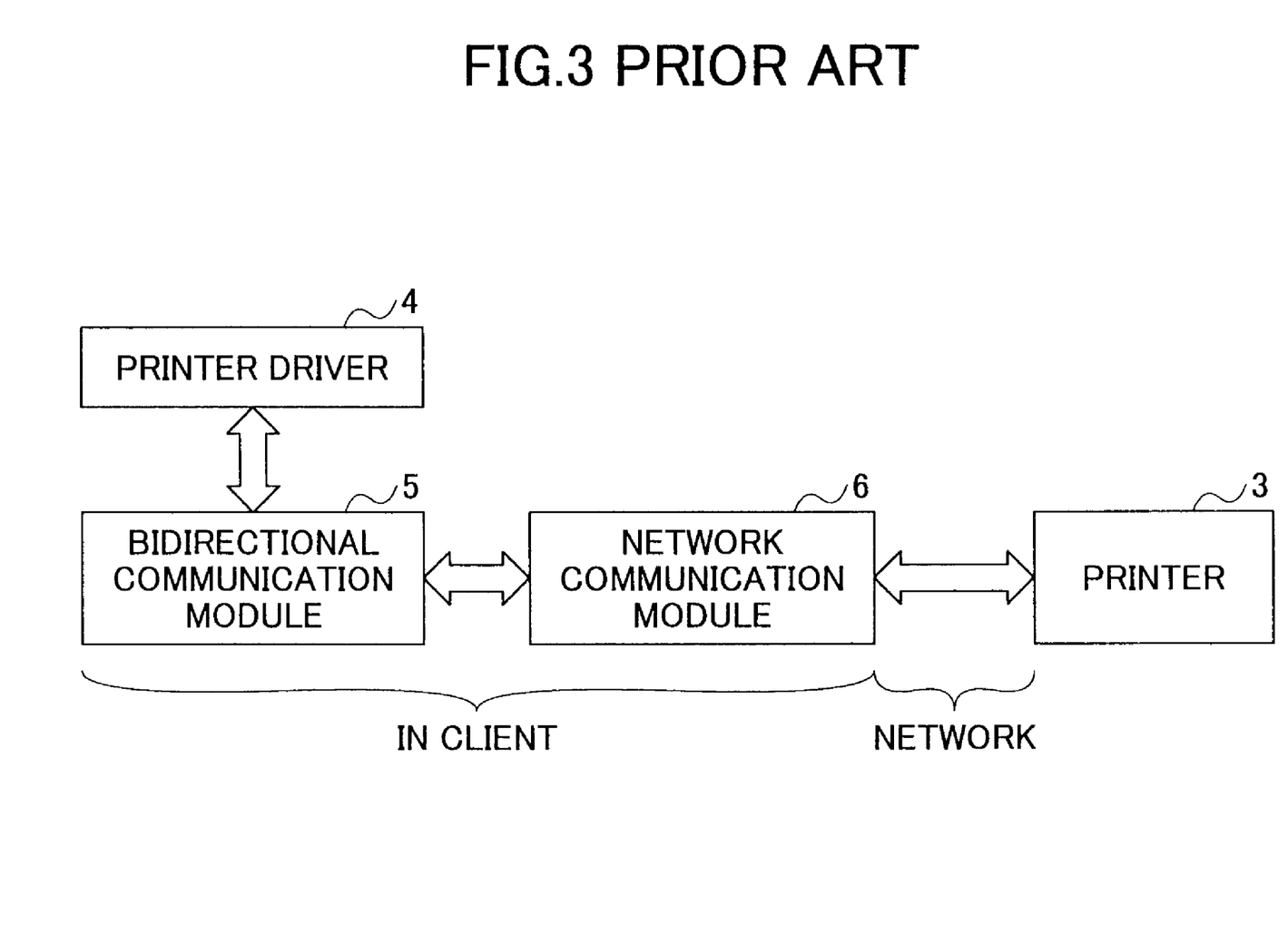
FIG. 3 is a figure for explaining bidirectional communication according to a conventional technology.
Figure 6:
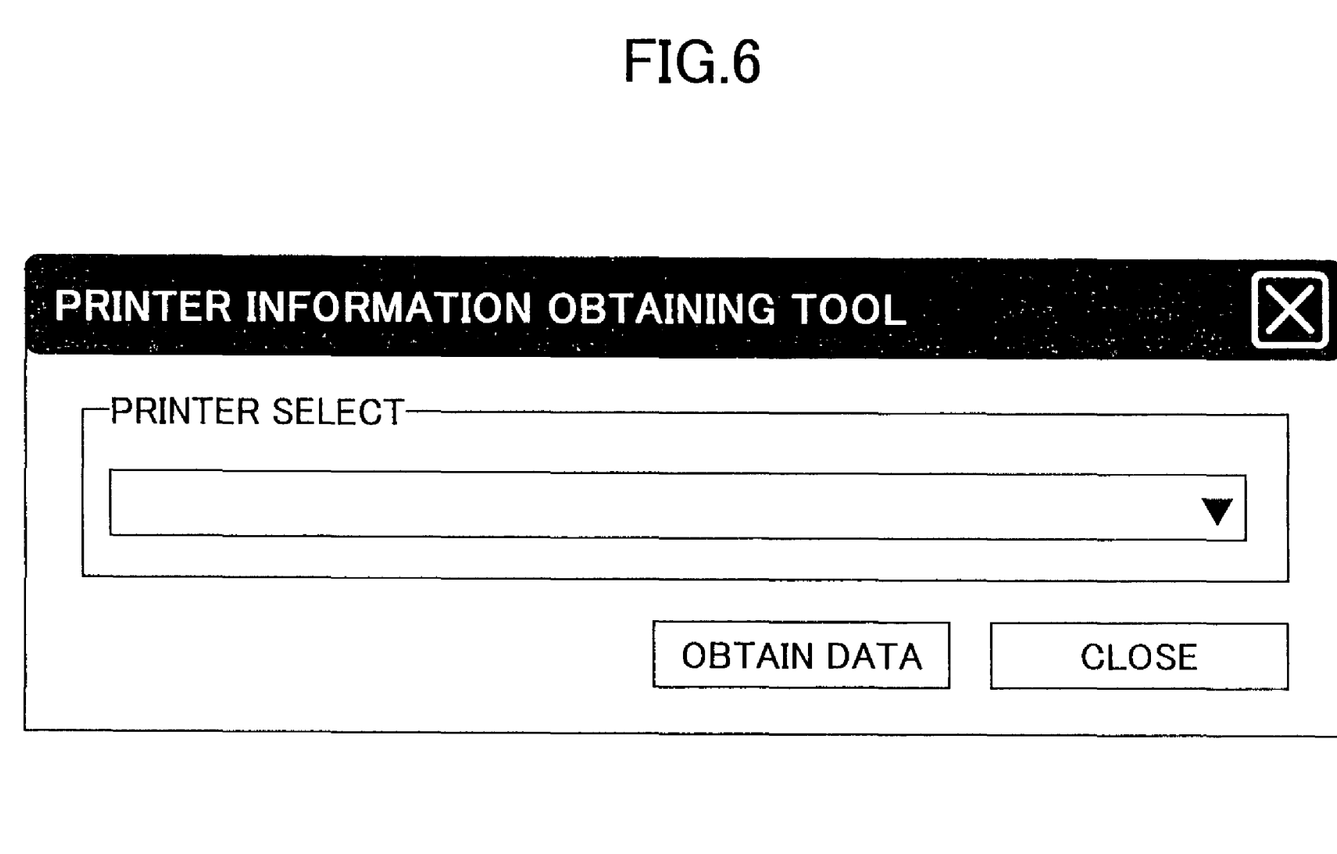
FIG. 6 shows an example of a window displayed on a client display by the configuration data obtaining tool.

At this time, for example, the client 2 displays a window shown in FIG. 6 so that the user of the client 2 selects a printer driver installed in the client 2. As a result, a printer from which configuration data is to be obtained is specified. Then, the client obtains data from the specified printer and stores the obtained data. The mechanism for obtaining the configuration data by using the configuration data obtaining tool is the same as the mechanism in which configuration data is obtained by a printer driver (bidirectional communication module) and the network communication module as shown in FIG. 3.

The configuration data obtaining tool can be also installed in a server instead of in a PC as long as a printer driver for the target printer is installed in the server or the PC.

Next, as shown in FIG. 5B, the configuration data 8 and the pseudo network communication module 7 are installed in the Metaframe server 1 by copying the configuration data 8 and the pseudo network communication module 7 in a predetermined folder in the Metaframe server 1. The pseudo network communication module 7 may be installed beforehand.

It is also possible to store the configuration data 8 in the client 2 so that the Metaframe server 1 obtains the data via a network. However, since it is desirable to decrease data amount transmitted over the network in the Metaframe environment, the configuration data is stored in the server 1 according to the present embodiment.

Next, procedure for reflecting configuration data on the printer driver in the server will be described with reference to FIG. 7. The following processing can be performed when the logical printer is auto-created, or when the user of the client opens a property screen of the printer driver after the logical printer is created.

Figure 7:
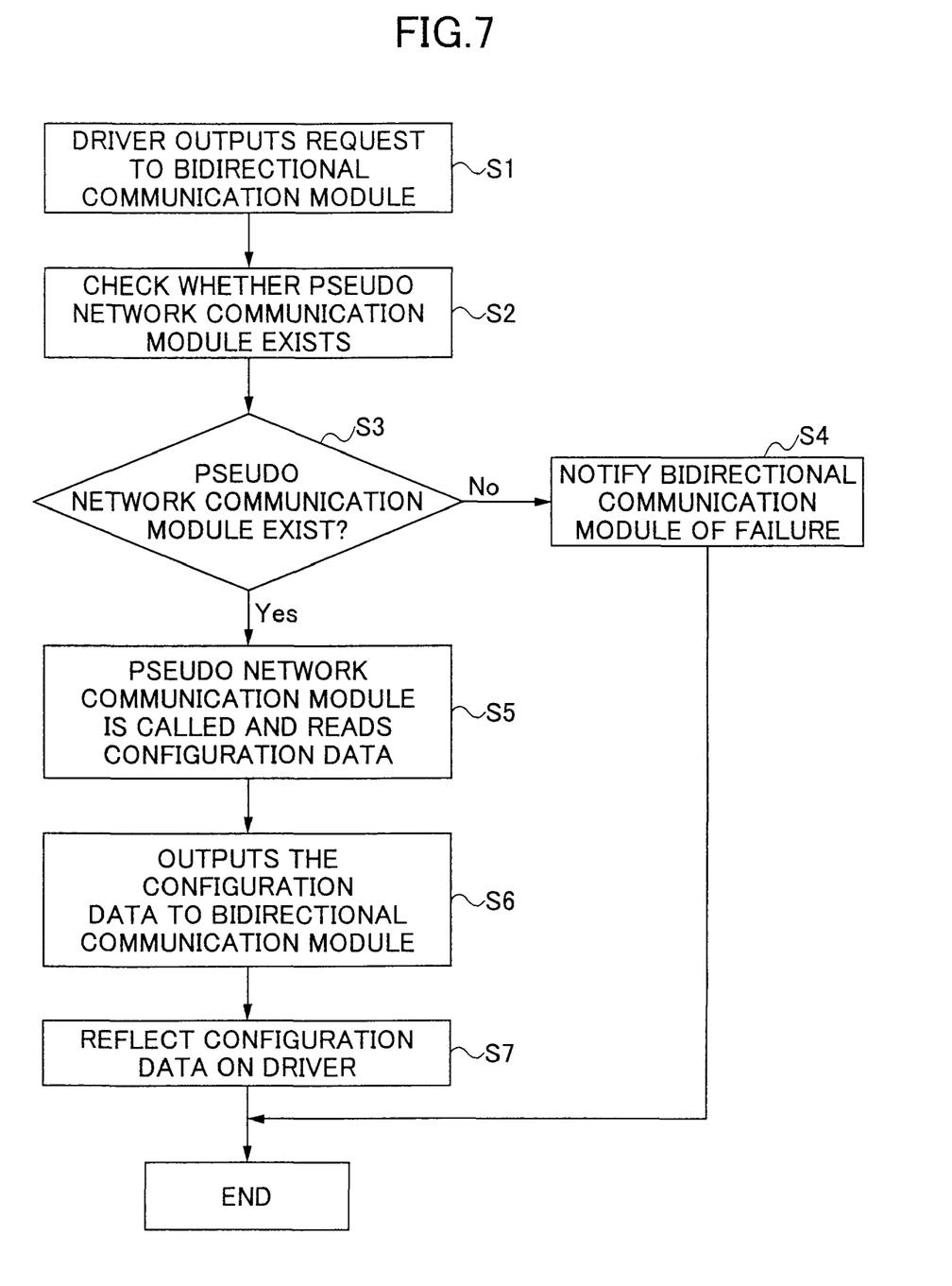
FIG. 7 shows a flowchart of a procedure for reflecting configuration data on the printer driver in the server.

In FIG. 7, first, the printer driver outputs an option data obtaining request to the bidirectional communication module 5 in step 1. The option data obtaining request includes an instruction indicating which items of configuration data to obtain such as tray information and the like. Next, the bidirectional communication module 5 checks whether the pseudo network communication module 7 exists in step 2.

If the pseudo network communication module 7 does not exist (NO in step 3), the server notifies the bidirectional communication module 5 that the process fails in step 4, and the process ends. If the pseudo network communication module 7 exists (Yes in step 3), the pseudo network communication module 7 is called and the pseudo network communication module 7 obtains configuration data corresponding to the option data obtaining request from the configuration data file 8 in step 5. After that, the read data is output to the bidirectional communication module 5 in step 6. The obtained configuration data is reflected on setting of the printer driver in step 7.

(Details of the Pseudo Network Communication Module)

Next, the configuration of the pseudo network communication module will be described in detail, in which the pseudo network communication module is compared with the normal network communication module.

Figure 8A:
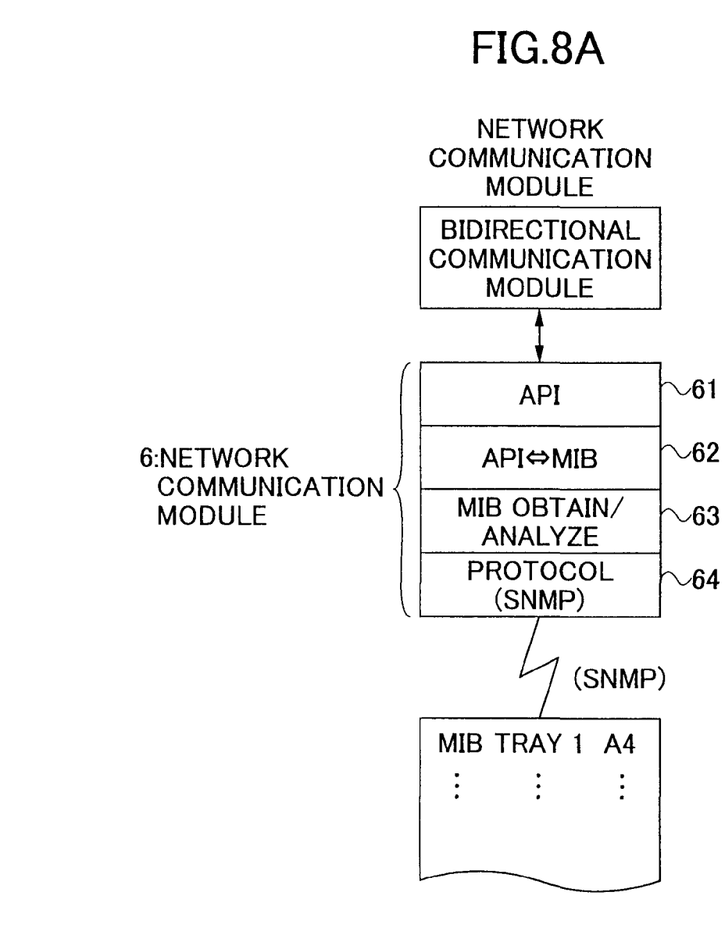
FIG. 8A shows the configuration of the conventional network communication module 6.
Figure 8B:
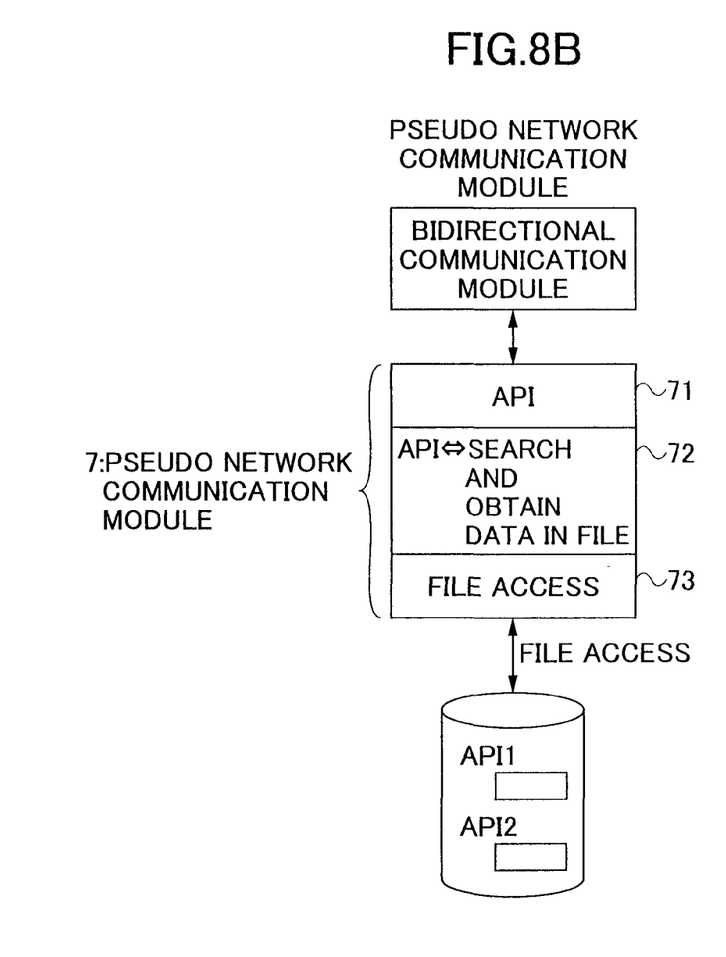
FIG. 8B shows the configuration of the pseudo network communication module 7 of an embodiment of the present invention.

FIG. 8A shows the configuration of the conventional network communication module 6. FIG. 8B shows the configuration of the pseudo network communication module 7 of the present embodiment.

As shown in FIG. 8A, the conventional network communication module 6 includes API (application program interface) 61, a converting part 62, a MIB obtaining/analyzing part 63, and a protocol implemented part 64. The API 61 is for interfacing between the application program for specifying information to be obtained and the network communication module 6. The API is a set of functions, for example, each of which corresponds to a piece of MIB data. The function itself may be called as an API. The converting part 62 converts between information specified by the application via API and MIB data. The MIB obtaining/analyzing part 63 obtains and analyzes MIB data on the printer. According to this configuration, the network communication module 6 can obtains configuration data (option data) that is MIB data by using bidirectional communication.

As shown in FIG. 8B, the pseudo network communication module 7 includes API 71 that is the same as that of the conventional network communication module 6. In addition, the pseudo network communication module 7 includes a file search/data obtaining part 72 and a file accessing part 73. The file search/data obtaining part 72 determines which piece of configuration data to obtain in the configuration data file according to information specified by the API 71 and searches the file and obtains the piece of configuration data. The file accessing part 73 performs processing for actually accessing the file.

In the configuration shown in FIG. 8B, the API 71 and the API 61 are the same. Thus, from the viewpoint of the bidirectional communication module, the pseudo network communication module 7 and the network communication module 6 appear to be the same. Therefore, a printer driver same as a conventional printer driver can be used in the Metaframe server according to the present invention.

The pseudo network communication module can be stored in a recording medium such as an IC card, CD-ROM and the like, so that the pseudo network communication module can be installed in the server from the recording medium. The pseudo network communication module can be also installed in the server via a network.

(Relationship Between the Pseudo Network Communication Module and the Configuration Data Obtaining Method)

Figure 9:
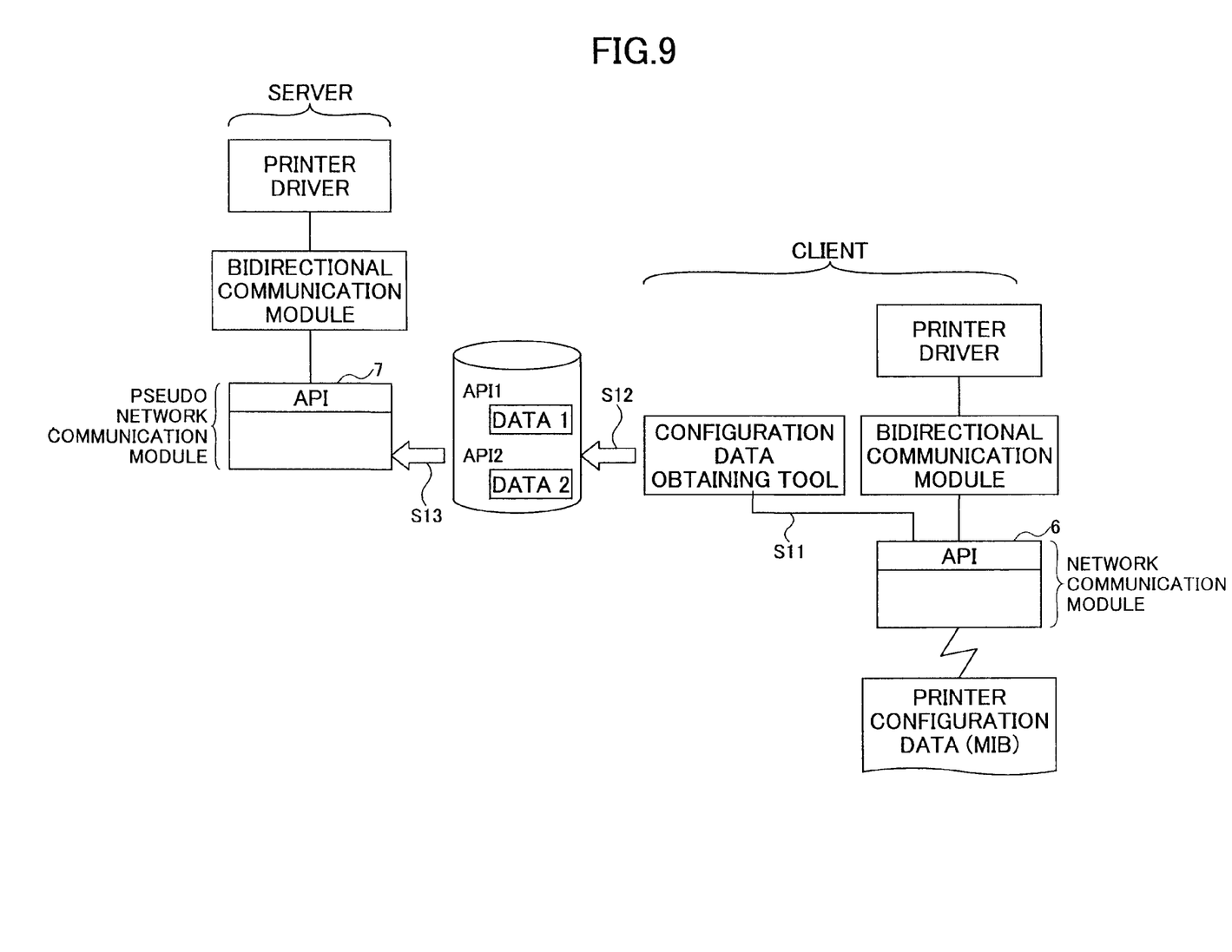
FIG. 9 is a figure for explaining the relationship between the pseudo network communication module and the configuration data obtaining method of the present invention.

Next, the relationship between the pseudo network communication module and the configuration data obtaining method will be described with reference to FIG. 9.

As mentioned before, the configuration data is obtained by the client 2 by using a software configuration similar to that for performing conventional bidirectional communication. That is, as shown in client side configuration in FIG. 9, the configuration data obtaining tool obtains configuration data by using SNMP via APIs in the network communication module 6. Since the configuration data is obtained by using the conventional APIs, the configuration data can be obtained API by API. Thus, data file in which configuration data includes API by API is stored in the Metaframe server as the configuration data file.

For obtaining the configuration data in the client, the configuration obtaining tool calls all APIs in step 11, and obtains configuration data (parameters) corresponding to the APIs and stores the configuration data as the configuration data file in step 12, in which each piece of the configuration data is associated with a corresponding API.

By storing the configuration data in such a format, the pseudo network communication module 7 in the server can use APIs same as the APIs that are conventionally used in a printer driver in the client. Thus, the pseudo network communication module 7 can read, from the configuration data file, pieces of configuration data requested by the bidirectional communication module in the printer driver in the Metaframe server, and can return the pieces of configuration data to the bidirectional communication module in step 13. The pseudo network communication module 7 can read the pieces of configuration data without changing the configuration data.

(Embodiment in which a Plurality of Printer Drivers are Used for a Printer)

It is possible to use a plurality of printer drivers for a printer in this embodiment. This embodiment will be described with reference to FIG. 10.

Figure 10:
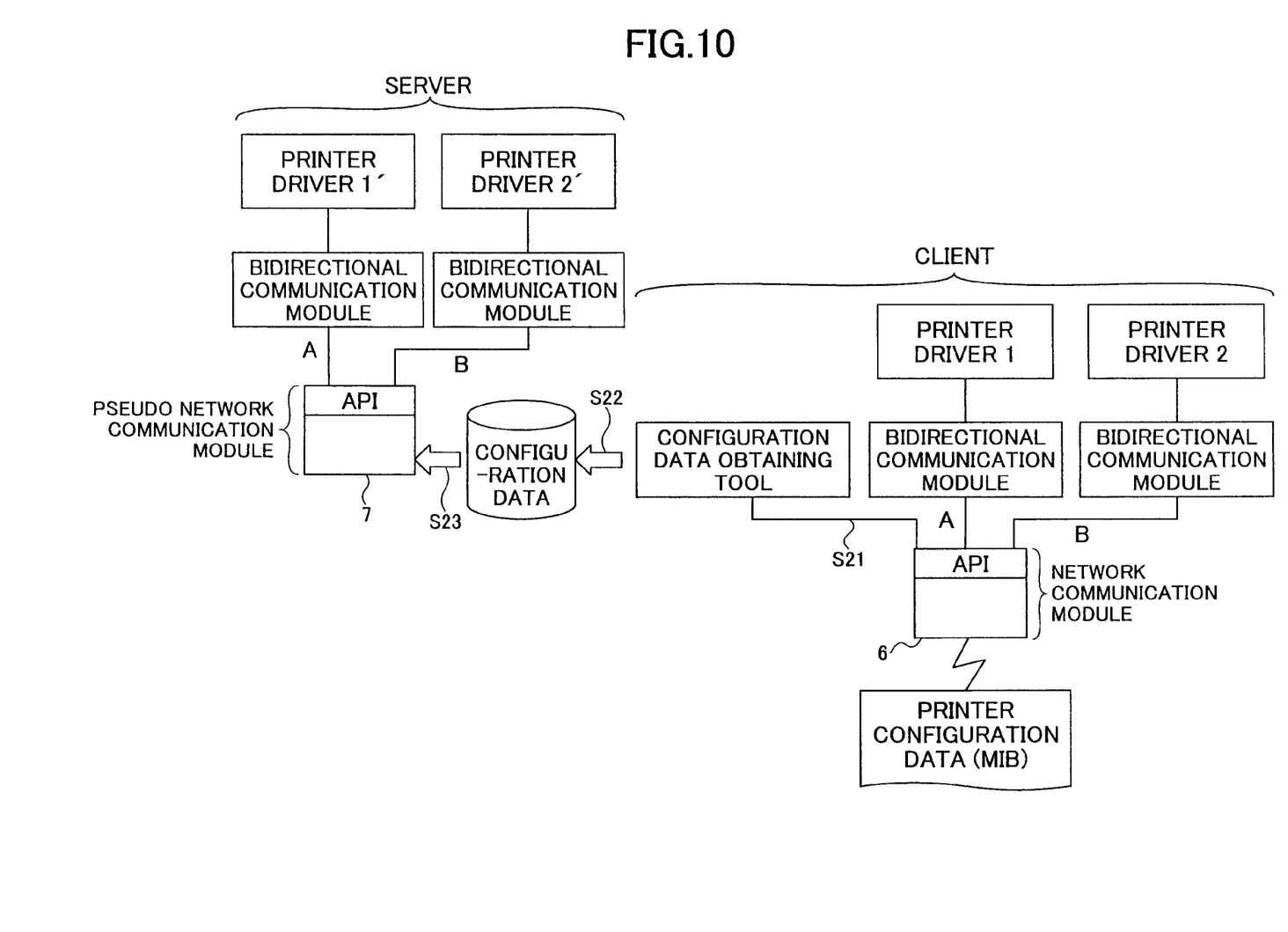
FIG. 10 is a figure for explaining a case in which a plurality of printer drivers is used for a printer.

In this embodiment, there is a case in which each printer driver needs different configuration data. That is, the printer driver 1 obtains data A and the printer driver 2 obtains data B.

In such a case, the configuration data obtaining tool calls all APIs (including APIs corresponding to A and B) in step 21, and stores pieces of configuration data (including A and B) corresponding to the APIs obtained from the printer's MIB data in step 22, in which each piece of the stored configuration data is associated with a corresponding API. By storing the configuration data in such a form, the pseudo network communication module 7 can read pieces of configuration data corresponding to APIs that are requested by the bidirectional communication modules by using the APIs, and can return pieces of configuration data to each bidirectional communication module in step 23. Accordingly, the pseudo communication module 7 can provide configuration data to a plurality of printer drivers.

According to the present invention, since the configuration data is stored in the server and the configuration data obtaining part provides the configuration data to the printer driver, the configuration data can be reflected on the printer driver. Therefore, the user can perform option setting such as tray setting, double-sided unit setting and the like for the auto-created logical printer in the Metaframe environment in which application programs run only on the server.

In the server of the present invention, the application program interface between the configuration data obtaining part and the printer driver in the server is the same as the application program interface between a network communication module and a client printer driver same as the printer driver in the server, in which the network communication module is used for obtaining configuration data of the printer for the client printer driver in a client terminal.

Therefore, a conventional printer driver can be used in the Metaframe server and the configuration data can be reflected.

The configuration data obtaining part in the server includes:
the application program interface;
a part for determining which piece of configuration data to obtain among the stored configuration data on the basis of information from the application program interface; and
a part for accessing the configuration data and reads the determined piece of configuration data. By configuring the configuration data obtaining part in this way, configuration data obtaining part can be realized by a simple configuration compared with the conventional network communication module.

In the server, the configuration data to be stored in the server is obtained from the printer by using a network communication module that performs bidirectional communication with the printer.

Thus, by using API that is the same as API of the network communication module for the configuration data obtaining part, the configuration data obtaining part can use the stored configuration data without any change. The configuration data obtaining part corresponds to the pseudo network communication module.

In addition, the configuration data is obtained by a computer that includes a software tool that causes the computer to display a window for selecting at least one printer driver included in the computer and to obtain configuration data from a printer corresponding to the selected printer driver.

In addition, the client, instead of the server, may store the configuration data, and the configuration data obtaining part in the server may obtain the configuration data from the client.

The present invention is not limited to the specifically disclosed embodiments, and variations and modifications may be made without departing from the scope of the present invention.

What is claimed is:

1. A system in which a printer, a client apparatus and a server apparatus are connected via a network,
the client apparatus comprising:
a configuration data obtaining part configured to obtain configuration data of the printer from the printer; and
a transfer part configured to transfer the configuration data of the printer to the server apparatus, the server apparatus comprising:
a printer driver configured to make a request for the configuration data to the printer when reflecting the configuration of the printer into the printer driver;
a storing part configured to store the configuration data transferred from the client apparatus, before a logical printer corresponding to the printer is created; and
a reading part, when the logical printer corresponding to the printer is being created, reading the configuration data from the storing part based on the request for the configuration data by the printer driver and reflecting the configuration data into the printer driver;
wherein the server apparatus includes a server-side API (application program interface) that is same as a client-side API used for the client apparatus to obtain the configuration data by communicating with the printer, and the server apparatus uses the server-side API to read the configuration data from the storing unit;

wherein the server apparatus does not obtain the configuration data directly from the printer from the printer, and instead the printer driver on the server apparatus reflects the configuration data obtained by the client from the printer, into the printer driver.

2. The system as claimed in claim 1, wherein the client apparatus further includes a user interface for selecting a printing device from which the configuration data is obtained.

3. The system as claimed in claim 2, wherein the configuration data obtained by the printer driver on the server apparatus is reflected in option setting for the selected printing device.

4. The system as claimed in claim 1, wherein after the configuration data obtaining part obtains the configuration data of the printer from the printer, the transfer part automatically transfers the configuration data of the printer to the server apparatus.

5. A method for maintaining consistent printer configuration data in a system in which a printer, a client apparatus and a server apparatus are connected via a network, said method comprising:

(a) obtaining, by the client apparatus, configuration data of the printer from the printer;

(b) automatically transferring the configuration data of the printer from the client apparatus to the server apparatus, upon receiving the configuration data in (a), and before a logical printer corresponding to the printer is created, storing the configuration data in a storage part accessible to the server apparatus;

(c) causing, when the logical printer corresponding to the printer is created, a printer driver, for the printer, on the server apparatus to reflect the configuration data into the printer driver on the server apparatus; and (d) providing on the server apparatus a server-side API (application program interface) that is same as a client-side API on the client apparatus, for obtaining the configuration data by communicating with the printer;

wherein the server apparatus does not obtain the configuration data directly from the printer from the printer, and instead the printer driver on the server apparatus reflects the configuration data obtained by the client from the printer, into the printer driver.

6. The method as claimed in claim 5, further comprising providing a user interface for selecting a printing device from which the configuration data is obtained in (a).

7. The method as claimed in claim 5, further comprising reflecting the configuration data transferred to the server apparatus to be reflected in option setting for the printer on the server apparatus.

8. The method as claimed in claim 5, further comprising:

retrieving the configuration data from the storage part, wherein the retrieved configuration data is utilized in (c) to reflect the configuration data in the printer driver for the printer on the server apparatus.

* * * * *